United States Patent
Tuvim

(10) Patent No.: US 6,436,291 B1
(45) Date of Patent: Aug. 20, 2002

(54) PERMANENTLY RADIALLY COMPRESSED COLUMN

(75) Inventor: Yuri Tuvim, Newton, MA (US)

(73) Assignee: Waters Investments Limited

( * ) Notice: Subject to any disclaimer, the term of this patent is extended or adjusted under 35 U.S.C. 154(b) by 176 days.

(21) Appl. No.: 09/593,552

(22) Filed: Jun. 14, 2000

Related U.S. Application Data

(62) Division of application No. 09/262,604, filed on Mar. 4, 1999, now Pat. No. 6,096,204.

(51) Int. Cl.[7] .............................................. B01D 15/08
(52) U.S. Cl. .................................... 210/656; 210/198.2
(58) Field of Search ................................ 210/656, 659, 210/198.2; 95/82; 96/101

(56) References Cited

U.S. PATENT DOCUMENTS

| | | | | |
|---|---|---|---|---|
| 3,941,490 A | * | 3/1976 | Anton | 401/110 |
| 4,211,658 A | * | 7/1980 | McDonald | 210/198.2 |
| 4,228,007 A | * | 10/1980 | Rausch | 210/198.2 |
| 4,250,035 A | * | 2/1981 | McDonald | 210/198.2 |
| 4,350,595 A | * | 9/1982 | Gunkel | 210/198.2 |
| 5,089,125 A | * | 2/1992 | Hart | 210/198.2 |
| 5,220,928 A | * | 6/1993 | Oddsen | 128/898 |
| 5,540,464 A | * | 7/1996 | Picha | 210/198.2 |
| 5,866,008 A | * | 2/1999 | Shalon | 210/198.2 |
| 5,893,971 A | * | 4/1999 | Shalon | 210/198.2 |
| 6,348,150 B1 | * | 2/2002 | Tuvim | 210/198.2 |

* cited by examiner

Primary Examiner—Ernest G. Therkorn
(74) Attorney, Agent, or Firm—Anthony J. Janiuk

(57) ABSTRACT

A permanently radially compressed chromatographic column having a flexible-walled encasement containing chromatographic media, and a wound element surrounding the encasement for radially compressing the column.

8 Claims, 2 Drawing Sheets

PERMANENTLY RADIALLY COMPRESSED COLUMN

This application is a divisional of U.S. Ser. No. 09/262,604 filed, Mar. 04, 1999, now U.S. Pat. No. 6,096,204.

FIELD OF THE INVENTION

The present invention relates generally to high performance liquid chromatography (HPLC), and more specifically to HPLC columns.

BACKGROUND OF THE INVENTION

Chromatography is a method by which components of a solution phase are separated by the different affinities exhibited by the components for a stationary phase. Chromatography has become an important tool for measuring the compositions of materials used in the chemical, pharmaceutical, biotechnological, and food industries.

HPLC instrument is comprised of a pump for delivering and moving solvents (the mobile phase), an injector to introduce a sample of interest into the flow of the mobile phase, a tubular column encasement, containing a packed material or bed (the "stationary phase"), and a detector to register the presence and amount of different components in the mobile phase. When the mobile phase is passed through the stationary phase, each component will emerge from the column at a different time because different component in the sample will have different affinities for the packing material. The presence of a particular component in the mobile phase exiting the column can be detected by measuring changes in physical or chemical properties of the eluent. By plotting the detector's signal over time, response "peaks" corresponding to the presence of each of the components of the sample can be observed and recorded.

The resolution between response peaks in a chromatographic analysis or "run" depends, in part, on providing a uniform and reproducible flow of the mobile phase through the stationary phase. Irregularities or changes in the packing material in the column from run to run adversely affect reproducibility of runs, and the reliability of the chromatographic analysis. For example, voids in the packed bed create flow irregularities, leading to overlapping responses or muted response peaks.

The chromatography column encasement is typically stainless steel. This encasement is tightly packed with the stationary phase material by slurry packing, by tapping, or by mechanical ramming.

Within rigid-wall steel columns, voids can occur not only within the packing, but also at the interface between the packing and the encasement wall. This leads to a phenomenon referred to as side or wall channeling, where the mobile phase travels down the wall of the column effectively bypassing the packing or stationary phase. Such side channeling decreases the reliability and reproducibility of the chromatographic peaks, and hence their analytical value.

While a tightly packed bed is less prone to deterioration, degradation still occurs no matter how well the packing is initially done. Vibration during shipping and handling, temperature fluctuations, and/or mobile phase changes can also cause the formation of voids.

Columns have been made with a plastic encasement containing the packing materials. However, such plastic columns tend to have poor performance. Under the pressure of a mobile phase, the plastic expands and voids are formed between the packing material and the plastic tube wall resulting in the loss of performance.

A typical plastic column is packed such that the chromatographic medium is under initial radial compression. This radial compression is provided by the plastic walls of the column. When used, the column is further radially compressed under the influence of gas or liquid. To achieve this the column is placed in a pressure vessel and subjected to external compression pressures up to 1000 psi. This approach requires the chromatography bench to be equipped with an appropriately sized apparatus to provide compression of the column. Such apparatus adds to the expense of the standard chromatography work station.

A simple mechanism to impart and maintain radial compression on chromatography columns is desired.

SUMMARY OF THE INVENTION

The present invention provides a substantially permanently radially compressed chromatography column which does not require additional compression on the chromatography bench.

According to the invention, a substantially permanently radially compressed chromatographic column is provided having a flexible-walled encasement containing chromatographic media. A wound element is fixedly disposed surrounding the encasement and provides radial compression of the column.

A preferred wound element comprises a wire or filament. The wire or filament is wound or spun on the encasement under tension. The tension is translated mechanically as a radially directed compression force.

In the alternative, the wound element is a high tensile tape secured by adhesive means or heat welding to the encasement or the tape itself. The high tensile tape is wound or spun on the encasement under tension. The tension is translated mechanically. as a radially directed compression force.

The present invention features increased radial compression. In addition, the natural resiliency of the flexible walls of the encasement prevents the formation of voids during handling and shipping. The present invention advantageously provides for permanent radial compression, such that channeling and other factors which lead to performance degradation during the use of the chromatography apparatus are substantially diminished.

The present invention also advantageously provides for a low cost alternative to the prior art, dispensing with the need for expensive radial compression apparatus on the chromatography bench.

Further advantageously, the present invention provides a chromatographic column with an enhanced usable life span compared with the prior art.

BRIEF DESCRIPTION OF THE DRAWINGS

The foregoing and other features and advantages of the present innovation will be more fully understood from the following detailed description of an illustrative embodiment, taken in conjunction with the accompanying drawing in which.

DETAILED DESCRIPTION OF AN ILLUSTRATIVE EMBODIMENT

The present invention will be described herein with reference to an illustrative embodiment of a permanently radially compressed chromatographic column.

Figure 1A:
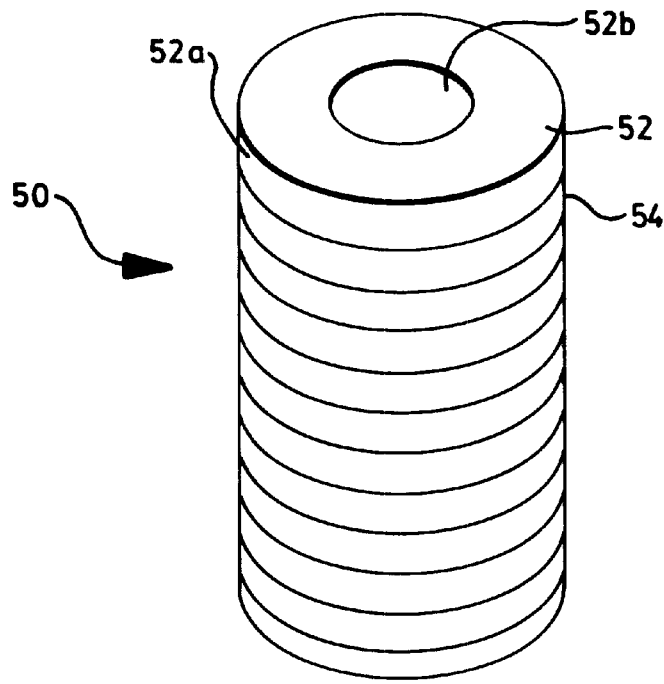
FIG. 1a depicts one aspect of a column according to the present invention.
Figure 1B:
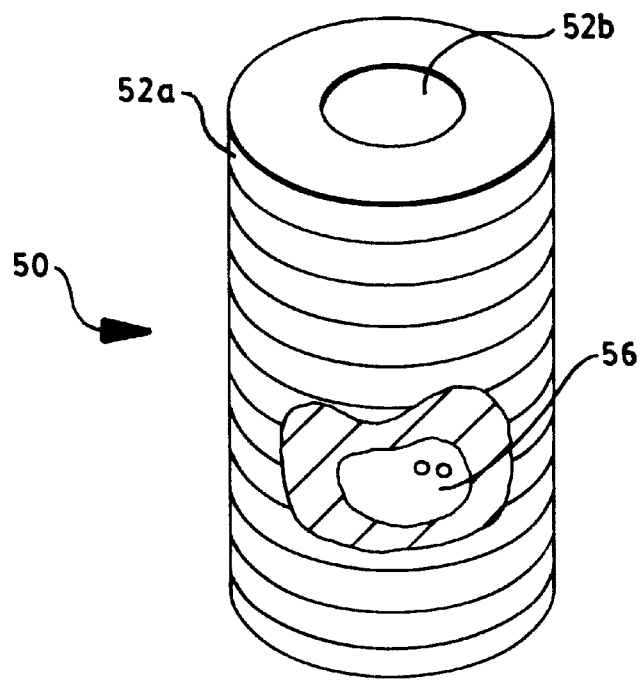
FIG. 1b depicts the column of FIG. 1a in partial cross-section.

FIGS. 1a and 1b depict one aspect of a chromatographic column according to the present invention. As illustrated, the chromatographic column, generally designated by the numeral 50, comprises the following major parts: a column encasement 52, a wound element in the form of a wire or filament 54, and a stationary phase 56.

Encasement 52 is a plastic tube having an exterior wall 52a and interior wall 52b. The interior wall 52b defines a chamber for containing a packing material 56. Encasement 52 is packed with the stationary phase 56 as seen in FIG. 1b. The packing of stationary phase 56 forces the walls of encasement 52 radially outward.

For purposes of clarity and convenience this discussion will refer to the wound element as a wire 54 with the understanding that a filament may substitute for such wire. Wire 54 is wound, under tension, about encasement 52. This tension is mechanically translated as a radical compressive force. Wire 54 may be wound as one or more layers, as best seen in FIG. 1b. These layers may run in the same direction or form a crossing pattern. A crossing pattern may be preferred to allow greater tension to be applied to the wire without such wire slipping into grooves formed by preceding layers. In the alternative, a wrap of tape (not shown) can be placed between layers. Multiple layers allow greater compressive forces to be placed on the encasement 52.

Preferably, the ends of the wire 54 are be welded, glued or otherwise secured. Preferably, the initial end of the wrapped wire is secured to the encasement 52. The end of the wire 54, after the column shell 52 has been wound, is secured to the encasement 52 or preceding layers or windings of the wire.

Wire is readily available from a variety of vendors. A filament of high tensile plastic may be substituted for wire 54. Filaments are available from several vendors. Such filaments are commonly employed for fish line and the like. Smaller diameter filaments are widely used by industry for manufacturing various vessels.

Figure 2A:
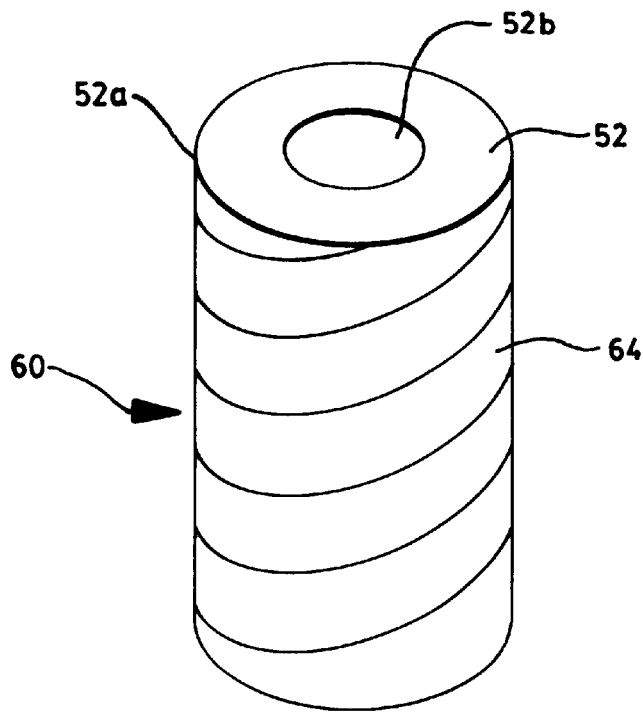
FIG. 2a depicts a further aspect of a column according to the present invention; and, FIG. 2b depicts the column of FIG. 2b in partial cross section.

FIG. 2a depicts a further aspect of a chromatographic column according to the present invention. As illustrated, the chromatographic column, generally designated by the numeral 60, comprises the following major parts: a column encasement 52, a wound element in the form of a high tensile tape 64, a packing medium 56. Encasement 52 is a plastic tube having an exterior wall 52a and an interior wall 52b. The interior wall 52b defines a chamber for containing a packing material 56. Encasement 52 is packed with the stationary 56, as seen in FIG. 1b. The packing of stationary phase 56 forces the walls of encasement 52 radially outward.

Figure 2B:
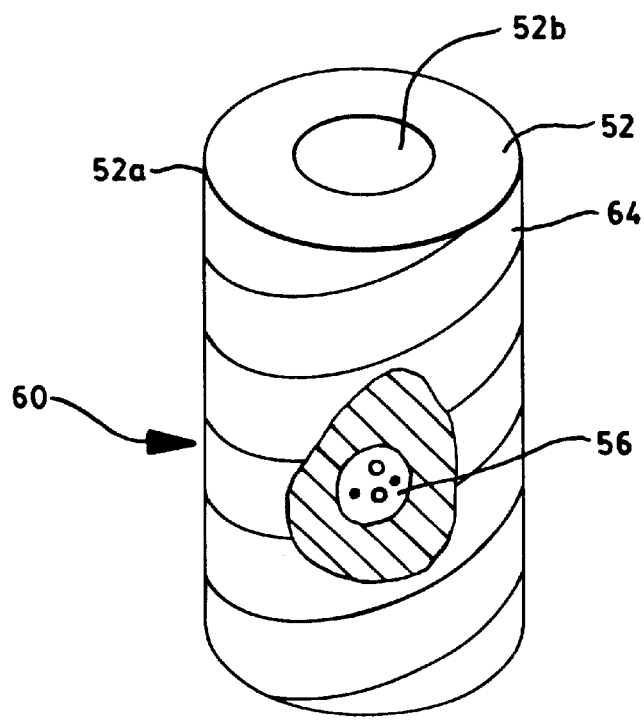

High tensile tape 64 is wound, under tension, about encasement 52. This tension is mechanically translated into a radial compressive force. High tensile tape 64 is wound as a single sheet comprising one or more layers, as tape is carried on a tape dispenser; or, as multiple sheets comprising one or more layers as illustrated in FIG. 2b. These sheets may run in the same direction or form a crossing pattern. Preferably, the high tensile tape 64 has no folds and lies substantially flat against the surface of the encasement 52. Multiple layers allow greater compressive forces to be placed on the encasement 52.

Preferably, the high tensile tape 64 has an adhesive surface to adhere to the encasement 52 and to layers of tape. In the alternative the ends of the tape may be heat welded, glued or otherwise secured.

High tensile tape is readily available from a variety of vendors. High tensile tape is commonly employed to seal and secure packages and mail. High tensile tape may further comprise filaments and webbing. One suitable high tensile tape is sold as packing tape.

Preferably, encasement 52 has packing medium 56 in place and under pressure as the wire 54 or high tensile tape 64 is wrapped. The secured ends of the wire 54 or tape 64 prevent the wire or tape from unwinding and releasing the radial pressure, particularly as the internal pressure of the column increases during the flow of a mobile phase through the column 50 or 60.

The column 50 or 60 may be equipped with seals and fittings known in the art. These seals and fittings allow the column to be placed in fluid communication with pumps and detectors. Seals and fittings are described in a copending U.S. patent application Ser. No. 09/079,994, filed May 15, 1998, entitled "Permanently Compressed Chromatography Cartridge".

A further embodiment of the present invention comprises a method of making a chromatographic column. The method comprises the steps of providing a encasement 52. The method further comprises the step of wrapping a wound element 54 or 64 around the encasement 52. And preferably the method comprises the stage of securing the wound element 54 or 64 to the encasement 52 to itself.

Preferably, the encasement 52 contains a chromatographic media 56 which media is radially compressed with the encasement 52. In the alternative, the method comprises the step of placing a chromatographic media in the encasement 52 after such encasement is wrapped with a wound element 54 or 64.

The present invention advantageously supplements the natural resiliency of the flexible walls of a encasement with that of a wound element thus maintaining the encasement under increased radial compression. This offers distinct advantages over metal columns, which cannot be compressed and also over the prior art flexible wall columns. The present invention, by permanently radially compressing the columns with forces sufficient to maintain uniformity of the separation medium dispenses with numerous problems inherent in the prior art design.

Further, the present invention can be manufactured inexpensively. Use is not required complicated apparatus for radially compressing the column composed of a source of pressure, a chamber, tubing, check valve(s), gauge(s), etc. is replaced by a simple device that holds the column between two end connectors.

Although the invention has been shown and described with respect to exemplary embodiments thereof, various other changes, additions and omissions in the form and detail thereof may be made therein without departing from the spirit and scope of the invention.

What is claimed is:

1. A method for forming a permanently radially compressed chromatographic column comprising the steps of:
    a) providing a encasement having flexible walls defining an outer cylindrical surface and a inner wall, said inner wall defining a chamber for receiving a packing media;
    b) providing a wound element wrapping and surrounding said outer surface under tension to provide a radial compressive force on said flexible walls to provide radial compression to the encasement said wound element being selected from the group consisting of wire, filament, and tape.

2. The method of claim 1 further comprising a step of securing said ends of said wound elements.

3. The method of claim 1 further comprising a step of placing a chromatographic media in said chamber.

4. The method of claim 1 wherein said wound element is a tape.

5. The method of claim 4 wherein said tape is a high tensile tape.

6. The method of claim 5 wherein said wound element is a wire or filament.

7. The method of claim 6 wherein said wire or filament is wound in layers.

8. The method of claim 1 wherein said wound element is wrapped around the encasement under tension to provide a radial compressive force on the encasement.

* * * * *